(12) United States Patent
Takamori et al.

(10) Patent No.: US 10,036,120 B2
(45) Date of Patent: Jul. 31, 2018

(54) SHOE PRESS BELT

(71) Applicant: Ichikawa Co., Ltd., Bunkyo-ku (JP)

(72) Inventors: Yuya Takamori, Bunkyo-ku (JP);
Nobuharu Suzuki, Bunkyo-ku (JP);
Mitsuyoshi Matsuno, Bunkyo-ku (JP);
Chie Umehara, Bunkyo-ku (JP); Yuji Mizoguchi, Bunkyo-ku (JP); Taichi Sakai, Bunkyo-ku (JP)

(73) Assignee: Ichikawa Co., Ltd., Bunkyo-ku (JP)

( * ) Notice: Subject to any disclaimer, the term of this patent is extended or adjusted under 35 U.S.C. 154(b) by 0 days.

(21) Appl. No.: 15/415,101

(22) Filed: Jan. 25, 2017

(65) Prior Publication Data

US 2017/0218568 A1    Aug. 3, 2017

(30) Foreign Application Priority Data

Feb. 1, 2016 (JP) .................................. 2016-028364
Dec. 27, 2016 (JP) .................................. 2016-252789
Jan. 23, 2017 (JP) .................................. 2017-009648

(51) Int. Cl.
*D21F 3/02* (2006.01)
*C08G 18/10* (2006.01)
(Continued)

(52) U.S. Cl.
CPC ........... *D21F 3/0227* (2013.01); *C08G 18/10* (2013.01); *C08G 18/44* (2013.01); *C08G 18/4858* (2013.01)

(58) Field of Classification Search
CPC ..... D21F 3/0227; D21F 3/0236; C08G 18/10; C08G 18/44; C08G 18/4858;
(Continued)

(56) References Cited

U.S. PATENT DOCUMENTS 7,947,154 B2 * 5/2011 Yazaki .................. C08G 18/10
162/358.4
7,955,475 B2 * 6/2011 Yazaki .................. D21F 3/0227
162/358.4

(Continued)

FOREIGN PATENT DOCUMENTS

DE    10 2011 079 892 A1    1/2013
EP    2248944 A1 * 11/2010 ............. C08G 18/10
(Continued)

OTHER PUBLICATIONS

Machien Translation of DE-102011079892 A1, Published on Jan. 31, 2013.*

(Continued)

*Primary Examiner* — Jose A Fortuna
(74) *Attorney, Agent, or Firm* — Oblon, McClelland, Maier & Neustadt, L.L.P.

(57) ABSTRACT

There is provided a shoe press belt for a papermaking machine, comprising one or more resin layers. At least a part of the resin layers comprises a polyurethane resin comprising polymeric MIDI as an ingredient. The polyurethane resin may be a resin obtainable by reacting one or more curing agent(s) having an active hydrogen group, polymeric MDI and one or more urethane prepolymer(s) having a terminal isocyanate group, the urethane prepolymer(s) being obtainable by reacting one or more isocyanate compound(s) with one or more polyol(s).

7 Claims, 4 Drawing Sheets

(51) Int. Cl.
*C08G 18/44* (2006.01)
*C08G 18/48* (2006.01)

(58) Field of Classification Search
CPC ............ Y10S 162/901; Y10T 442/209; Y10T 442/2123; Y10T 442/273
See application file for complete search history.

(56) References Cited

U.S. PATENT DOCUMENTS

| | | | | |
|---|---|---|---|---|
| 8,303,776 | B2 * | 11/2012 | Landensuo | D21F 3/0227 |
| | | | | 162/358.4 |
| 9,096,707 | B2 * | 8/2015 | Singh | C08G 18/4854 |
| 9,732,470 | B2 * | 8/2017 | Yamazaki | D21F 3/0227 |
| 9,777,433 | B2 * | 10/2017 | Takamori | D21F 3/029 |
| 2006/0191658 | A1 | 8/2006 | Watanabe et al. | |
| 2010/0130701 | A1 * | 5/2010 | Landensuo | D21F 3/0227 |
| | | | | 525/453 |
| 2010/0314067 | A1 * | 12/2010 | Yazaki | C08G 18/10 |
| | | | | 162/358.2 |
| 2011/0017419 | A1 * | 1/2011 | Yazaki | D21F 3/0227 |
| | | | | 162/289 |
| 2011/0253328 | A2 * | 10/2011 | Yazaki | D21F 7/083 |
| | | | | 162/100 |
| 2012/0132384 | A1 | 5/2012 | Hagfors et al. | |
| 2013/0192787 | A1 * | 8/2013 | Yazaki | D21F 3/0227 |
| | | | | 162/358.4 |
| 2014/0352904 | A1 * | 12/2014 | Singh | C08G 18/4854 |
| | | | | 162/164.6 |
| 2016/0130755 | A1 * | 5/2016 | Yamazaki | D21F 3/0227 |
| | | | | 162/289 |
| 2016/0208437 | A1 * | 7/2016 | Umehara | D21F 1/0036 |
| 2016/0355978 | A1 * | 12/2016 | Takamori | D21F 3/029 |
| 2017/0218568 | A1 * | 8/2017 | Takamori | D07B 3/103 |

FOREIGN PATENT DOCUMENTS

| | | | | |
|---|---|---|---|---|
| EP | 3199700 A1 * | 8/2017 | | C08G 18/10 |
| EP | 3199700 A1 * | 8/2017 | | C08G 18/10 |
| JP | 2002-146694 | 5/2002 | | |
| JP | 2008-111220 | 5/2008 | | |
| JP | 2009185427 A * | 8/2009 | | C08G 18/10 |
| JP | WO 2010106802 A1 * | 9/2010 | | D21F 7/083 |
| JP | 2010242274 A * | 10/2010 | | D21F 7/083 |
| JP | 2011012366 A * | 1/2011 | | D21F 3/0227 |
| JP | 2011026711 A * | 2/2011 | | D21F 3/0227 |
| JP | 2011102444 A * | 5/2011 | | D21F 7/083 |
| JP | 2012036549 A * | 2/2012 | | |
| JP | 2012-511611 | 5/2012 | | |
| JP | 2012154014 A * | 8/2012 | | |
| JP | 2012154015 A * | 8/2012 | | |
| JP | 2013159860 A * | 8/2013 | | D21F 3/0227 |
| JP | 2016132852 A * | 7/2016 | | D21F 1/0036 |
| JP | 2017002451 A * | 1/2017 | | D21F 3/029 |
| WO | WO 2009/004122 A1 | 1/2009 | | |
| WO | WO 2013/013891 A1 | 1/2013 | | |

OTHER PUBLICATIONS

Extended European Search Report dated May 31, 2017 in Patent Application No. 17153113.0.

* cited by examiner

SHOE PRESS BELT

CROSS REFERENCE TO RELATED APPLICATION(S)

This application is based upon and claims benefit of priority Japanese Patent Application No. 2016-028364, filed on Feb. 1, 2016, Japanese Patent Application No. 2016-252789, filed on Dec. 27, 2016 and Japanese Patent Application No. 2017-009648, filed on Jan. 23, 2017, the entire contents of which are incorporated herein by reference.

BACKGROUND

The present invention relates to a shoe press belt for a papermaking machine.

Papermaking machines for removing moisture from a source material of paper are generally equipped with a wire part, a press part, and a dryer part. These parts are arranged in the order of the wire part, the press part, and the dryer part in a wet paper web transfer direction.

A wet paper web is transferred and moisture thereof is removed while the wet paper web is being successively passed through papermaking devices provided in the wire part, the press part, and the dryer part, and the wet paper web is finally dried in the dryer part. In those parts, the papermaking devices corresponding to a function of dehydrating a wet paper web (wire part), a function of squeezing water (press part), and a function of drying the wet paper web (dryer part) are used.

The press part generally comprises one or more press devices arranged in series in the wet paper web transfer direction. An endless felt is disposed in each press device, or an endless felt formed by connecting an ended felt on a papermaking machine is disposed therein. In addition, each press device has a roll press mechanism made up of a pair of rolls facing each other or a shoe press mechanism in which an endless shoe press belt is interposed between a recessed shoe facing a roll and the roll. The felt, on which the wet paper web is placed, is passed through the roll press mechanism or the shoe press mechanism and pressurized while moving the felt in the wet paper web transfer direction, and thereby moisture of the wet paper web is continuously squeezed from the wet paper web by being absorbed into the felt or by passing moisture through the felt to discharge the moisture to the outside.

In the shoe press belt, a reinforcement material is embedded in resin and the resin constitutes an outer circumferential layer, which is brought into contact with the felt, and an inner circumferential layer, which is in contact with the shoe. In addition, the shoe press belt repeatedly travels between the pressurized roll and the shoe, and therefore the resin of the shoe press belt is required to have mechanical properties such as a wear resistance, a crack resistance, a resistance to fatigue from flexing, and a heat resistance, and some studies regarding the resin of the shoe press belt have been carried out in order to improve those required properties (for example, JP 2012-511611T, JP 2008-111220A, JP 2002-146694A, and WO 2013/013891).

In these documents, investigations have been conducted on a belt in which mechanical properties such as a heat resistance, a crack resistance, a resistance to fatigue from flexing, and a wear resistance are improved by selecting, regarding polyurethane, a specific prepolymer, i.e., isocyanate and polyol, and a specific curing agent.

SUMMARY

In a papermaking industry, under a circumference, in which operation conditions of papermaking machines are getting even more severe due to increase in operation speed to improve in productivity of paper or due to higher efficient dehydration of a wet paper web by increase in pressure of a press unit, the shoe press belts disclosed in the above-mentioned documents are therefore also required to further improve mechanical properties of the shoe press belts.

Therefore, an object of the present invention is to provide a shoe press belt having excellent mechanical properties of the shoe press belt, in particular, an excellent wear resistance.

The inventors of the present invention have diligently studied to achieve the above-mentioned object, and, as a result, found that, when specific isocyanate is mixed as a part of a prepolymer of resin used in a shoe press belt, the shoe press belt exerts excellent mechanical properties, in particular, an excellent wear resistance, thereby achieving the present invention.

That is, the present invention relates to the following.
(1) A shoe press belt used in a papermaking machine, comprising
one or more resin layers,
wherein at least a part of the resin layers comprises a polyurethane resin comprising polymeric MDI as an ingredient.
(2) A shoe press belt according to (1),
wherein the polyurethane resin is a resin obtainable by reacting
one or more curing agent(s) having an active hydrogen group,
polymeric MDI, and
one or more urethane prepolymer(s) having a terminal isocyanate group, the urethane prepolymer(s) being obtainable by reacting one or more isocyanate compound(s) with one or more polyol(s).
(3) The shoe press belt according to (1) or (2),
wherein the polyurethane resin is a resin obtainable by reacting one or more curing agent(s) having an active hydrogen group with a mixture of polymeric MDI and one or more urethane prepolymer(s) having a terminal isocyanate group, the urethane prepolymer(s) being obtainable by reacting one or more isocyanate compound(s) with one or more polyol(s).
(4) The shoe press belt according to (2) or (3),
wherein the isocyanate compound(s) in the urethane prepolymer(s) comprise(s) one or more of isocyanate compounds selected from the group consisting of toluene diisocyanate, diphenylmethane diisocyanate, and 1,4-phenylene diisocyanate.
(5) The shoe press belt according to any one of (2) to (4),
wherein the polyol(s) comprise(s) one or more of polyol selected from the group consisting of polytetramethylene glycol and polycarbonate diol.
(6) The shoe press belt according to any one of (2) to (5),
wherein the curing agent(s) comprise(s) one or more of compounds selected from the group consisting of a polyamine compound and a polyol compound.
(7) The shoe press belt according to any one of (2) to (6),
wherein the curing agent(s) comprise(s) dimethylthiotoluenediamine and/or 1,4-butanediol.
(8) The shoe press belt according to any one of (1) to (7),
wherein a mixing amount of the polymeric MDI is 0.1 wt % to 15 wt % with respect to a total resin weight of the part.
(9) The shoe press belt according to any one of (1) to (7),
wherein a mixing amount of the polymeric MDI is 1 wt % to 13 wt % with respect to a total resin weight of the part.

Advantageous Effects of Invention

According to the above-mentioned configuration, it is possible to provide a shoe press belt having excellent mechanical properties of the shoe press belt, in particular, an excellent wear resistance.

DETAILED DESCRIPTION OF THE EMBODIMENT(S)

Hereinafter, a preferred embodiment of a production method of a shoe press belt according to the present invention will be described in detail with reference to the drawings. It should be noted that, in this specification and the appended drawings, structural elements that have substantially the same function and structure are denoted with the same reference signs, and repeated explanation thereof is omitted.

A shoe press belt according to a preferred embodiment of the present invention will be described.

Figure 1:
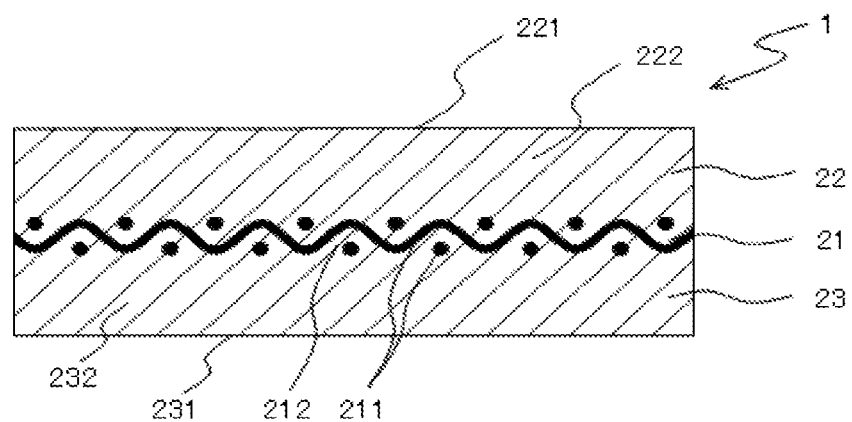
FIG. 1 is a cross-sectional view in a cross machine direction, showing an example of a shoe press belt according to an embodiment of the present invention.

FIG. 1 is a cross-sectional view in a cross machine direction, showing an example of the shoe press belt according to the preferred embodiment of the present invention. Note that, in FIG. 1, the size of each member is emphasized as appropriate to facilitate description, and FIG. 1 does not show the actual proportion or size of each member. Herein, the above cross machine direction is also referred to as "CMD", and a machine direction is also referred to as "MD".

A shoe press belt 1 shown in FIG. 1 is used for transferring a wet paper web in cooperation with a felt in a press part, more specifically in a shoe press mechanism, of a papermaking machine and squeezing moisture from the wet paper web.

The shoe press belt 1 forms an endless band-shaped body. That is, the shoe press belt 1 is an annular belt. In addition, a circumferential direction of the shoe press belt 1 is generally disposed along a machine direction (MD) of the papermaking machine.

The shoe press belt 1 shown in FIG. 1 comprises a reinforcing fibrous substrate layer 21, a first resin layer (a resin layer having an outer circumferential layer surface 221 to be brought into contact with a felt) 22 provided on one principal surface on an outer surface side of the reinforcing fibrous substrate layer 21, and a second resin layer (a resin layer having an inner circumferential layer surface 231 to be brought into contact with a shoe) 23 provided on the other principal surface on an inner surface side of the reinforcing fibrous substrate layer 21, and the shoe press belt 1 is formed by laminating those layers.

The reinforcing fibrous substrate layer 21 comprises a reinforcing fibrous substrate 211 and resin 212. The resin 212 exists in the reinforcing fibrous substrate layer 21 so as to fill gaps between fibers in the reinforcing fibrous substrate 211. That is, the reinforcing fibrous substrate 211 is impregnated with a part of the resin 212, and the reinforcing fibrous substrate 211 is embedded in the resin 212.

There are no particular limitations with regard to the reinforcing fibrous substrate 211. However, for example, fabrics woven by a weaving machine and the like from warp and weft yarns are commonly used. Moreover, it is also possible to use a grid-like web material of superimposed rows of warp and weft yarns without weaving.

There are no particular limitations with regard to the fineness of the fibers constituting the reinforcing fibrous substrate 211. However, for example, the fineness can be set to 300 to 10,000 dtex and can preferably be set to 500 to 6,000 dtex.

Moreover, the fineness of the fibers constituting the reinforcing fibrous substrate 211 may be different depending on a part in which the fibers are used. For example, the fineness of the warp and weft yarns in the reinforcing fibrous substrate 211 may be different.

As a material of the reinforcing fibrous substrate 211, it is possible to use one or a combination of two or more of polyesters (polyethylene terephthalate, polybutylene terephthalate, and the like), aliphatic polyamides (polyamide 6, polyamide 11, polyamide 12, polyamide 612, and the like), aromatic polyamides (aramid), polyvinylidene fluoride, polypropylene, polyether ether ketone, polytetrafluoroethylene, polyethylene, wool, cotton, metals, and the like.

Next, the resin 212 in the reinforcing fibrous substrate layer 21, resin 222 of the first resin layer 22, and resin 232 constituting the second resin layer 23 of the shoe press belt 1 will be described. Moreover, at least a part of resin of the shoe press belt 1 comprises a urethane resin containing polymeric MDI (PMDI) as an ingredient. Note that compositions of the resin 212, the resin 222, and the resin 232 can be similar to one another, and therefore the resin 222 of the first resin layer 22 will be representatively described in detail below.

As materials of the resin 222 of the first resin layer 22, it is possible to use one or a combination of two or more of thermosetting resin such as urethane, epoxy, and acryl or thermoplastic resin such as polyamide, polyarylate, and polyester, and urethane resin can preferably be used.

As urethane resin used in the resin 222, it is possible to use a urethane resin containing polymeric MDI (PMDI) as an ingredient. The polymeric MDI can be added at any time without any limitation during the formation of the urethane resin.

Specifically, the urethane resin may be a resin cured and formed by reacting one or more curing agent(s) having an active hydrogen group with one or more urethane prepolymer having a terminal isocyanate group, the urethane prepolymer(s) being obtainable by reacting isocyanate compounds(isocyanate mixture) containing polymeric MDI (PMDI) as an isocyanate component of the prepolymer(s) with one or more polyol(s).

Alternatively, the polyurethane resin may be a resin formed by reacting one or more curing agent(s) having an active hydrogen group, polymeric MDI, and one or more urethane prepolymer(s) having a terminal isocyanate group, the urethane prepolymer(s) being obtainable by reacting one or more isocyanate compound(s) with one or more polyol(s). The polyurethane resin may more specifically be a resin formed by reacting one or more curing agent(s) having an active hydrogen group with a mixture of polymeric MDI and one or more urethane prepolymer(s) having a terminal isocyanate group, the urethane prepolymer(s) being obtainable by reacting one or more other isocyanate compound(s) with one or more polyol(s).

Further, the polyurethane resin may be a resin formed by reacting a curing agent having an active hydrogen group, polymeric MDI and one or more urethane prepolymer(s) having a terminal isocyanate group, the urethane prepolymer(s) being obtainable by reacting isocyanate compounds(isocyanate mixture) containing polymeric MDI (PMDI) as an isocyanate component of the prepolymer(s) with one or more polyol(s).

Polymeric MDI is a mixture containing monomeric MDI that is a monomer and a polymer thereof, which is also referred to as polymethylene polyphenyl polyisocyanate. A resin layer of the shoe press belt 1 is formed by using polymeric MDI together with the above components, and therefore the shoe press belt 1 has excellent mechanical properties, in particular, an excellent wear resistance.

There are no particular limitations with regard to NCO % of polymeric MDI. However, for example, NCO % can be 29 to 33%, and can preferably be 30 to 32.5%. With this, it is possible to satisfactorily improve a wear resistance.

Moreover, the use of polymeric MDI is generally differentiated depending on viscosity, and properties thereof can be different. There are no particular limitations with regard to the viscosity of polymeric MDI at 25° C. However, for example, the viscosity is 40 to 700 mPa·s and is preferably 100 to 300 mPa·s. With this, it is possible to prevent insufficient mixing and satisfactorily improve the wear resistance. The viscosity can be measured by using, for example, a method described in JIS Z 8803:2011.

There are no particular limitations with regard to a mixing amount of polymeric MDI. However, the mixing amount is preferably 0.1 wt % to 15 wt % and is more preferably 1 wt % to 13 wt % with respect to the total resin weight of a part in which polymeric MDI is used. With this, it is possible to secure a crack resistance while satisfactorily improving the wear resistance of the shoe press belt 1.

Moreover, as polymeric MDI, for example, Lupranate M20S, Lupranate M11S, Lupranate M5S (manufactured by BASF INOAC Polyurethanes Ltd.), Millionate MR-100, Millionate MR-200, and Millionate MR-400 (manufactured by Tosoh Corporation) can be used.

There are no particular limitations with regard to an isocyanate component of the prepolymer(s) used in the resin 222, and the isocyanate component can be aromatic polyisocyanate or aliphatic polyisocyanate. The isocyanate component can preferably be toluene diisocyanate (TDI), diphenylmethane diisocyanate (MDI), 1,4-phenylene-diisocyanate (PPDI), dimethyl biphenylene diisocyanate (TODI), naphthalene-1,5-diisocyanate (NDI), 4,4-dibenzyl diisocyanate (DBDI), 1,6-hexamethylene diisocyanate (HDI), 1,5-pentamethylene diisocyanate, 1-isocyanate-3-isocyanatomethyl-3,5,5-trimethylcyclohexane bis-(4-isocyanate cyclohexyl)methane (H12MDI), xylylene diisocyanate (XDI), cyclohexane diisocyanate (CHDI), bis-(isocyanatomethyl)-cyclohexane (H6XDI), and tetramethyl xylylene-diisocyanate (TMXDI), and can more preferably be diphenylmethane diisocyanate, toluene diisocyanate, 1,4-phenylene diisocyanate, and an isocyanate compound containing a compound selected from mixtures thereof.

A polyol component of the prepolymer(s) used in the resin 222 preferably contains polytetramethylene glycol (PTMG), polycarbonate diol (PCD), and a compound selected from mixtures thereof.

As one or more curing agent(s) used in the resin 222, it is possible to use a curing agent containing one or a combination of two or more of compounds selected from the group consisting of polyamine and polyol compounds, and dimethylthiotoluenediamine (DMTDA) and/or 1,4-butanediol (1,4-BD) can preferably be used.

Moreover, the resin 222 may also contain one or a combination of two or more of inorganic fillers such as titanium oxide, kaolin, clay, talc, diatomaceous earth, calcium carbonate, calcium silicate, magnesium silicate, silica, and mica.

Note that, in a case where a part that does not contain polymeric MDI exists in the resin 222, the part can be appropriately formed by using the above components. Specifically, the part of the resin 222 can be urethane resin cured/formed by reacting, with one or more curing agent(s) having an active hydrogen group, a mixture with a urethane prepolymer having a terminal isocyanate group obtainable by reacting one or more isocyanate component(s) with one or more polyol(s).

As the resin 232 constituting the second resin layer 23, it is possible to use one or a combination of two or more of resin materials that can be used in the above first resin layer 22. The resin 232 constituting the second resin layer 23 may be the same as or different from the resin 222 constituting the first resin layer 22 in types and compositions thereof.

Moreover, the second resin layer 23, as well as the first resin layer 22, may contain one or more of inorganic fillers.

In particular, the resin 232 constituting the second resin layer 23 are preferably the same as the resin 222 of the first resin layer 22 in terms of improvement in the wear resistance of the second resin layer 23 and improvement in resin manufacturing efficiency.

As the resin 212 constituting the reinforcing fibrous substrate layer 21, it is possible to use one or a combination of two or more of resin materials that can be used in the above first resin layer 22. The resin 212 constituting the reinforcing fibrous substrate layer 21 may be the same as or different from the resin 222 constituting the first resin layer 22 in and compositions thereof.

Moreover, the reinforcing fibrous substrate layer 21, as well as the first resin layer 22, may contain one or more of inorganic fillers.

In particular, the resin 212 constituting the reinforcing fibrous substrate layer 21 can also be the same as the resin 222 of the first resin layer 22 in terms of improvement in the resin manufacturing efficiency.

Note that, in the present invention, at least a part of one or more of the first resin layer 22, the reinforcing fibrous substrate layer 21, and the second resin layer 23 described above may be made of urethane resin formed by using polymeric MDI However, the resin 222 of the first resin layer 22 and/or the resin 232 of the second resin layer 23 are/is preferably made of urethane resin formed by using polymeric MDI in terms of improvement in the wear resistance.

There are no particular limitations with regard to a dimension of the above shoe press belt 1, and the dimension can be appropriately set in accordance with the use thereof.

For example, there are no particular limitations with regard to a width of the shoe press belt 1, and the width can be 700 mm to 13500 mm and can preferably be 2500 mm to 12500 mm.

Moreover, for example, there are no particular limitations with regard to a length (circumference) of the shoe press belt 1, and the length can be 150 cm to 600 cm and can preferably be 200 cm to 500 cm.

Moreover, there are no particular limitations with regard to a thickness of the shoe press belt 1, and the thickness can be, for example, 1.5 mm to 7.0 mm and can preferably be 2.0 mm to 6.0 mm.

Moreover, parts of the shoe press belt 1 may have different thicknesses or the same thickness.

Figure 2:
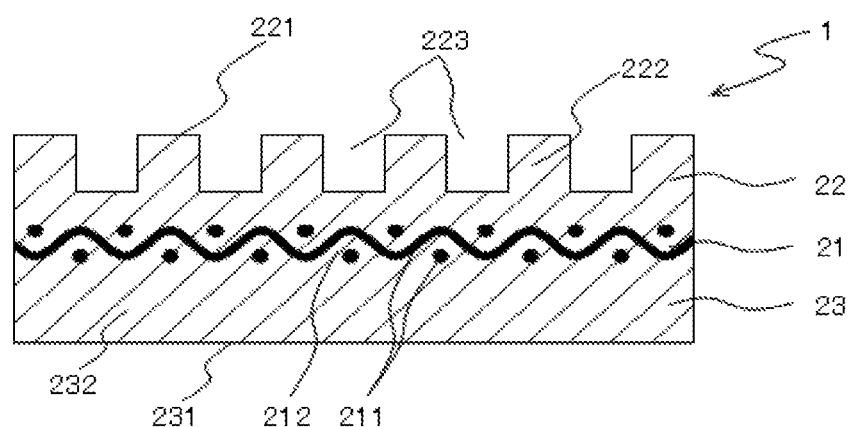
FIG. 2 is a cross-sectional view in a cross machine direction, showing another example of a shoe press belt according to an embodiment of the present invention.

As shown in FIG. 2, drains 223 are formed on a surface of a first resin layer 22A of a shoe press belt 1A, and therefore it is possible to dehydrate more moisture from a wet paper web. There are no particular limitations with regard to a form of the drains. However, generally, a plurality of successive grooves parallel to a machine direction of the shoe press belt is formed. For example, a groove width can be set to 0.5 mm to 2.0 mm, a groove depth can be set to 0.4 mm to 2.0 mm, and a number of grooves can be set to 5 grooves to 20 grooves/inch. Moreover, a cross-sectional shape of the groove can be appropriately set to a rectangular shape, a trapezoidal shape, or a U-shape, or can be set to round parts in which a land portion and a groove bottom portion are in contact with a groove wall.

Moreover, those drains may be the same drains or may be formed by combining different drains in terms of widths, depths, the number, cross-sectional shapes of the grooves. Further, those drains may be discontinuously formed or may be formed as a plurality of grooves parallel to the cross machine direction.

The above shoe press belts 1 and 1A can be produced by a production method of a shoe press belt described below.

Hereinabove, mechanical properties, in particular, a wear resistance is improved in the shoe press belts 1 and 1A according to the present embodiment.

A preferred embodiment of a production method of the above shoe press belts will be described. FIG. 3 to FIG. 6 are schematic views each showing a preferred embodiment of a production method of a shoe press belt.

The production method of a shoe press belt according to an embodiment of the present invention is a production method of a shoe press belt that carries a wet paper web via a felt and transfers the wet paper web to dehydrate moisture from the wet paper web and comprises a resin layer forming step of forming a first resin layer (felt-side resin layer having an outer circumferential layer surface to be brought into contact with the felt), a reinforcing fibrous substrate layer, and a second resin layer (shoe-side resin layer having an inner circumferential layer surface to be brought into contact with a shoe) and a step of forming drains on a surface of the first resin layer as necessary.

First, in the resin layer forming step, a resin layer is formed. In this step, specifically, the reinforcing fibrous substrate layer 21, in which an annular and band-shaped reinforcing fibrous substrate 211 is embedded in a resin material, and the first resin layer 22 and the second resin layer 23 serving as resin layers on both sides thereof are laminated to form a laminated body.

Such a laminated body may be formed by any method. However, in the present embodiment, the second resin layer 23 is formed, the reinforcing fibrous substrate 211 is disposed on one surface of the second resin layer 23, and a resin material is applied and impregnated into the reinforcing fibrous substrate 211 to form a laminated body, in which the reinforcing fibrous substrate layer 21 and the second resin layer 23 are integrated, and a first resin layer is then formed on a surface of the reinforcing fibrous substrate layer 22 opposite to an adhesive surface of the reinforcing fibrous substrate layer 21 and the second resin layer 23.

Figure 3:
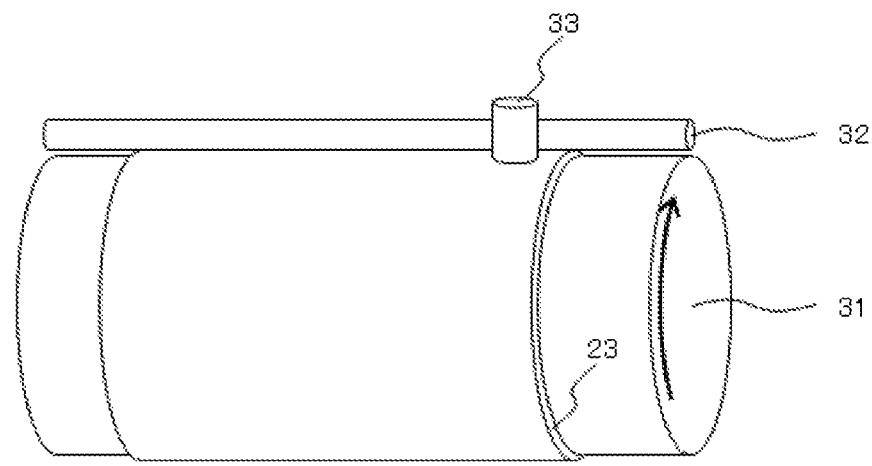
FIG. 3 is a schematic diagram showing a part of a preferred embodiment of a production method of a shoe press belt according to the present invention (a part of polishing step)

Specifically, for example, first, as shown in FIG. 3, the second resin layer 23 is formed by applying a resin material to a surface of a mandrel 31, the surface being a surface to which a release agent is applied, while rotating the mandrel 31 so that a thickness of the resin material is 0.8 to 3.5 mm, increasing a temperature of the second resin layer 23 to 40 to 140° C., and pre-curing the second resin layer 23 for 0.5 to 1 hour.

Figure 4:
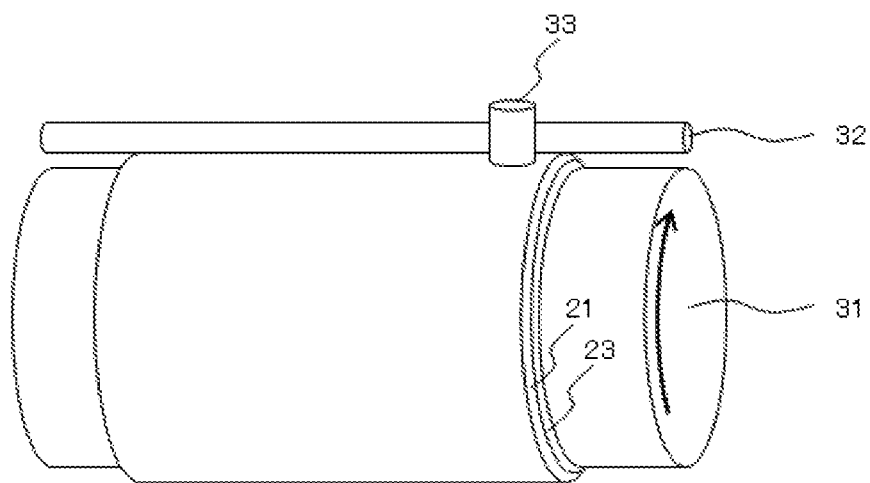
FIG. 4 is a schematic diagram showing a part of a preferred embodiment of a production method of a shoe press belt according to the present invention (a part of polishing step)

Then, a reinforcing fibrous substrate is disposed thereon (not shown), and, as shown in FIG. 4, a resin material constituting the reinforcing fibrous substrate layer 21 is applied to have a thickness of 0.5 to 2.0 mm while the mandrel 31 is being rotated so that the reinforcing fibrous substrate is impregnated with the resin material and the resin material penetrates the reinforcing fibrous substrate, and the reinforcing fibrous substrate layer 21 is caused to adhere to the second resin layer 23. Thus, the laminated body, in which the reinforcing fibrous substrate layer 21 and the second resin layer 23 are integrated, is formed.

Figure 5:
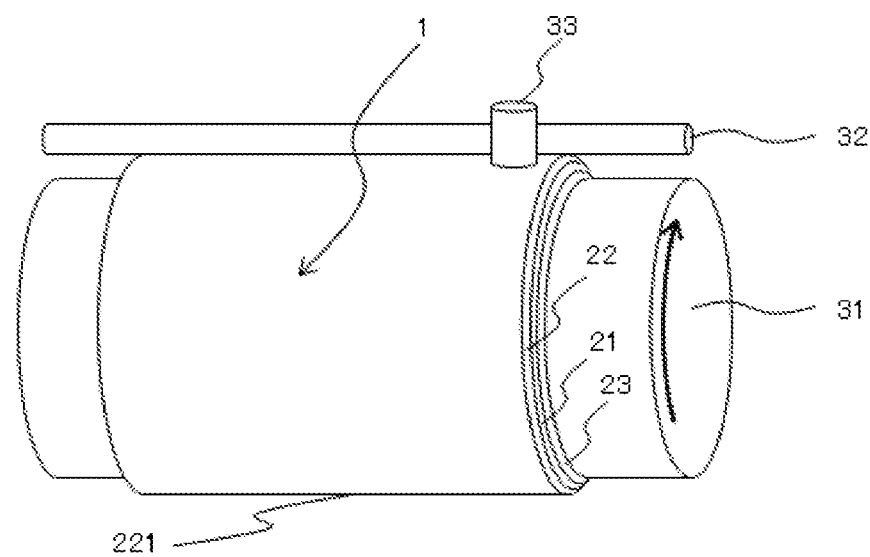
FIG. 5 is a schematic diagram showing a part of a preferred embodiment of a production method of a shoe press belt according to the present invention (a part of polishing step)

Thereafter, as shown in FIG. 5, a resin material constituting the first resin layer 22 is applied to a surface of the reinforcing fibrous substrate layer 21 while the mandrel 31 is being rotated so that a thickness of the resin material is 1.5 to 4 mm, to thereby impregnate the surface with the resin material, and the resin layer is heated and cured at 70 to 140° C. for 2 to 20 hours. Thus, the laminated body, in which the first resin layer 22 having the outer circumferential layer surface 221, the reinforcing fibrous substrate layer 21, and the second resin layer 23 are laminated, is formed.

Note that the resin material may be applied by any method. However, in the present embodiment, the resin material is applied by ejecting a resin material from an injection molding nozzle 33 while rotating the mandrel 31 to apply the resin material to each layer, and, at the same time, the applied resin material is uniformly applied to each layer by using a coater bar 32.

Moreover, there are no particular limitations with regard to a heating method. However, for example, it is possible to use a method using a far-infrared heater.

Further, as the resin material, the above urethane resin containing polymeric MDI (PMDI) as an ingredient is used in at least a part of a resin layer and is preferably used in at least a part of the first resin layer 22 (felt-side resin layer). The resin material may be applied as a mixture with the above inorganic fillers. Moreover, types and compositions of resin materials and inorganic fillers for constituting parts of the respective layers may be the same or different.

Then, in the groove forming step, drains are formed on the first resin layer. In this step, specifically, the drains 223 are formed on an outer surface (outer circumferential layer surface (felt contact surface) 221) of the laminated body.

Such the drains 223 may be formed by any method. However, in the present embodiment, the outer surface of the laminated body obtainable as described above is subjected to polishing or buffing (not shown) so as to have a desired thickness of the shoe press belt 1. Thereafter, as shown in, for example, FIG. 6, a grooving device 34 to which a plurality of disk-shaped rotary blades are attached is caused to abut on the outer circumferential layer surface (felt contact surface) 221 to form the drains 223 while the mandrel 31 is being rotated. Thus, the shoe press belt 1 is completed.

Note that there are no particular limitations with regard to the form of the drains 223. However, generally, a plurality of successive grooves parallel to the machine direction of the shoe press belt is formed. For example, a groove width can be set to 0.5 mm to 2.0 mm, a groove depth can be set to 0.4 mm to 2.0 mm, and a number of grooves can be set to 5 grooves to 20 grooves/inch. Moreover, a cross-sectional shape of the groove can be appropriately set to a rectangular shape, a trapezoidal shape, or a U-shape, or can be set to round parts in which a land portion and a groove bottom portion are in contact with a groove wall.

Moreover, those drains may be the same drains or may be formed by combining different drains in terms of widths, depths, the number, cross-sectional shapes of the grooves. Further, those drains may be discontinuously formed or may be formed as a plurality of grooves parallel to the cross machine direction.

Hereinabove, as the production method of a shoe press belt according to the embodiment of the present invention, there has been described a production method including a resin layer forming step of forming a resin layer, in which a first resin layer, a reinforcing fibrous substrate layer, and a second resin layer are laminated, and a groove forming step of forming drains on the first resin layer.

Note that the production method of a shoe press belt in the above embodiment has been described as a mandrel (single roll) process. However, as another embodiment, it is possible to produce a shoe press belt by hanging an annular reinforcing fibrous substrate from two rolls disposed in parallel, applying resin to this reinforcing fibrous substrate to impregnate the reinforcing fibrous substrate with the resin and laminate the resin on the reinforcing fibrous substrate to form a shoe-side resin layer, then inverting the reinforcing fibrous substrate and forming a felt-side resin layer on a surface of the inverted reinforcing fibrous substrate layer, and performing grooving (two-roll process). Moreover, the order of forming of the resin layers can be arbitrary.

Moreover, the groove forming step can be omitted in a case where it is unnecessary to form grooves in the shoe press belt.

Hereinabove, the present invention has been described on the basis of the preferred embodiment in detail. However, the present invention is not limited thereto, and it is possible to replace each configuration with an arbitrary configuration that can exert a similar function or add an arbitrary configuration.

Hereinafter, the present invention will be described more specifically on the basis of examples. However, the present invention is not limited to those examples.

1. Production of Shoe Press Belt

Shoe press belts in Examples 1 to 5 and Comparative Examples 1 to 4 were produced by a method described below with the use of resin shown in Table 1. In the preparation of the resin materials, an isocyanate and polyol shown in Table 1 was at first reacted to obtain a urethane prepolymer, the urethane prepolymer was mixed with PMDI to obtain a mixture, which was then mixed with a curing agent shown in Table 1. Note that, as PMDI, Millionate MR-200 manufactured by Tosoh Corporation was used. The viscosity of PMDI at 25° C. was 203 mPa·s, and NCO % was 30.9%.

TABLE 1

|  | Example 1 | Example 2 | Example 3 | Example 4 | Example 5 |
|---|---|---|---|---|---|
| Isocyanate | TDI | MDI | PPDI | PPDI | MDI |
| polyol | PTMG | PCD | PTMG | PCD | PCD |
| NCO % | 6.00% | 9.80% | 5.50% | 3.60% | 9.80% |
| PMDI mixing amount (wt %) | 2% | 2% | 13% | 13% | 1% |
| Curing agent | DMTDA | 1,4-BD | 1,4-BD | 1,4-BD | 1,4-BD |
| Equivalent ratio (H/NCO) | 0.95 | 0.95 | 0.95 | 0.9 | 0.95 |

|  | Comparative Example 1 | Comparative Example 2 | Comparative Example 3 | Comparative Example 4 |
|---|---|---|---|---|
| Isocyanate | TDI | MDI | PPDI | PPDI |
| polyol | PTMG | PCD | PTMG | PCD |
| NCO % | 6.00% | 9.80% | 5.50% | 3.60% |
| PMDI mixing amount (wt %) | 0% | 0% | 0% | 0% |
| Curing agent | DMTDA | 1,4-BD | 1,4-BD | 1,4-BD |
| Equivalent ratio (H/NCO) | 0.95 | 0.95 | 0.95 | 0.9 |

(1) Resin Layer Forming Step

A shoe-side resin layer (second resin layer) was formed by applying a resin material to a surface of a mandrel having a diameter of 1500 mm, the mandrel being rotatable by appropriate driving means, while rotating the mandrel so that a thickness thereof was 1.4 mm with the use of an injection molding nozzle movable in parallel to a rotary shaft of the mandrel and performing curing treatment (FIG. 3). Thereafter, the shoe-side resin layer was left standing at a room temperature for 10 minutes while the mandrel was being rotated, was heated to 140° C. by a heating device attached to the mandrel, and was pre-cured at 140° C. for 1 hour.

Then, a single layer of a grid-like web material (warp yarn density is 1 yarn/cm, and weft yarn density is 4 yarns/cm) in which warp yarns, the warp yarns being multifilament yarns having 550 dtex made of polyethylene terephthalate fibers, are sandwiched between weft yarns, the weft yarns being twisted yarns of multifilament yarns having 5000 dtex made of polyethylene terephthalate fibers, and intersections of the weft yarns and warp yarns are joined by using a urethane-based resin adhesive was disposed with no gap on an outer circumferential surface of the shoe-side resin layer so that the weft yarns were arranged in an axial direction of the mandrel. Then, a yarn-winding layer was formed on an outer circumference of this grid-like web material by spirally winding multifilament yarns having 6700 dtex made of polyethylene terephthalate fibers with a pitch of 30 yarns/5 cm, and those grid-like web material and yarn-winding layer constitute a reinforcing fibrous substrate. Thereafter, the same resin material as the resin material of the shoe-side resin layer was applied to fill a gap in the reinforcing fibrous substrate, and thus a laminated body, in which the reinforcing fibrous substrate layer and the shoe-side resin layer were integrated, was formed (FIG. 4).

Then, the same resin material as the resin materials of the reinforcing fibrous substrate layer and the shoe-side resin layer were applied onto the reinforcing fibrous substrate layer while the mandrel was being rotated so as to have a thickness of about 2.5 mm with the use of the injection molding nozzle movable in parallel to the rotary shaft of the mandrel to impregnate the reinforcing fibrous substrate layer with the resin material, and curing treatment was performed, and thus the laminated body, in which the felt-side resin layer (first resin layer), the reinforcing fibrous substrate layer, and the shoe-side resin layer were integrated, was formed (FIG. 5). In the curing treatment, the resin material was left standing at a room temperature for 40 minutes, was heated to 140° C. by a heating device attached to the mandrel, and was heated and cured at 140° C. for 3 hours.

Thereafter, a felt contact surface of the outer circumferential layer (felt-side resin layer) was polished so that the total thickness was 5.2 mm, and thus the laminated body was obtained.

(2) Groove Forming Step

Figure 6:
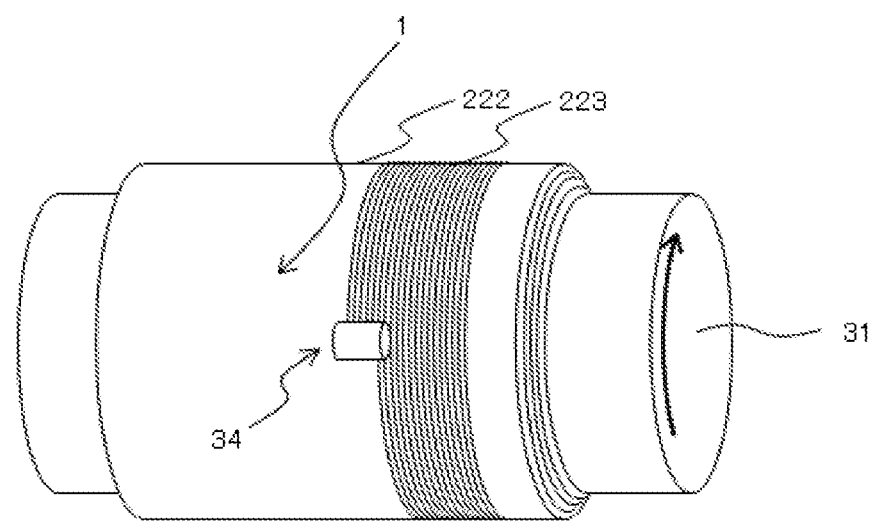
FIG. 6 is a schematic view showing a part of a preferred embodiment of a production method of a shoe press belt according to the present invention (a part of drain forming step)

The grooving device was caused to abut on an outer circumferential layer surface (felt contact surface) of the felt-side resin layer of the resultant laminated body to form a large number of drains (groove width of 0.8 mm, groove depth of 0.8 mm, pitch width of 2.54 mm) in the MD direction on the felt-side resin layer, and thus a shoe press belt was obtained (FIG. 6).

2. Wear-Property Evaluation

Figure 7:
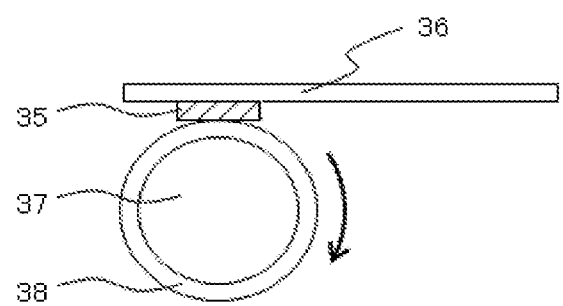
FIG. 7 is a schematic view showing an evaluation device for wear-resistance evaluation of a shoe press belt.

A test piece was collected from each of the resultant shoe press belts, and an evaluation device for wear-resistance evaluation shown in FIG. 7 was employed, a test piece 35 was attached to a lower portion of a pressboard 36, and then a rotation roll 37 provided with a wear element 38 on an outer circumferential thereof was rotated while being pressed against a lower surface (measurement target surface) thereof. At this time, a pressure caused by the rotation roll was set to 6.6 kg/cm and a rotation speed of the rotation roll was set to 100 m/minute, and the rotation roll was rotated for 45 seconds. An amount of reduction in (wear amount of) a thickness of a belt sample (test piece 35) was measured after rotation.

Test results of wear-resistance evaluation in Examples and Comparative Examples are shown in Table 2. Note that evaluation results are relative values of wear amounts in Examples and Comparative Examples to a wear amount in Comparative Example 1. Therefore, the wear resistance of the shoe press belt is better as a value in a section "Wear resistance" in Table 2 is smaller.

TABLE 2

| | Example 1 | Example 2 | Example 3 | Example 4 | Example 5 |
|---|---|---|---|---|---|
| Wear resistance (%) | 4 | 20 | 9 | 8 | 40 |

| | Comparative Example 1 | Comparative Example 2 | Comparative Example 3 | Comparative Example 4 |
|---|---|---|---|---|
| Wear resistance (%) | 100 | 87 | 48 | More than 150 |

As shown in Table 2, it is found that the wear resistance of the shoe press belts according to Examples 1 to 5 is improved, as compared to the wear resistance of the shoe press belts according to Comparative Examples 1 to 4.

What is claimed is:

1. A shoe press belt for a papermaking machine, comprising
    one or more resin layers,
    wherein at least a part of the resin layers comprises a polyurethane resin,
    wherein the polyurethane resin is a resin obtained by reacting
        a curing agent having an active hydrogen group,
        polymeric MDI, and
        a urethane prepolymer having a terminal isocyanate group, the urethane prepolymer being obtained by reacting an isocyanate compound other than polymeric MDI with a polyol,
    and wherein a mixing amount of the polymeric MDI is 0.1 wt % to 15 wt % with respect to a total resin weight of the part.

2. The shoe press belt according to claim 1, wherein the polyurethane resin is a resin obtained by reacting a curing agent having an active hydrogen group with a mixture of polymeric MDI and a urethane prepolymer having a terminal isocyanate group, the urethane prepolymer being obtained by reacting an isocyanate compound other than polymeric MDI with a polyol.

3. The shoe press belt according to claim 1, wherein the isocyanate compound in the urethane prepolymer comprises at least one isocyanate compound selected from the group consisting of toluene diisocyanate, diphenylmethane diisocyanate, and 1,4-phenylene diisocyanate.

4. The shoe press belt according to claim 1, wherein the polyol comprises at least one polyol selected from the group consisting of polytetramethylene glycol and polycarbonate diol.

5. The shoe press belt according to claim 1, wherein the curing agent comprises at least one compound selected from the group consisting of a polyamine compound and a polyol compound.

6. The shoe press belt according to claim 1, wherein the curing agent comprises dimethylthiotoluenediamine and/or 1,4-butanediol.

7. The shoe press belt according to claim 1, wherein a mixing amount of the polymeric MDI is 1 wt % to 13 wt % with respect to a total resin weight of the part.

* * * * *